(12) United States Patent
Eggenhuisen et al.

(10) Patent No.: US 11,155,695 B2
(45) Date of Patent: Oct. 26, 2021

(54) ABUSIVELY MOLDED ARTICLE INCLUDING UV-STABLE POLYCARBONATE

(71) Applicant: SABIC Global Technologies B.V., Bergen op Zoom (NL)

(72) Inventors: Tamara Marijke Eggenhuisen, Breda (NL); Roland Sebastian Assink, Middelburg (NL); Eduardus Ludovicus Louisa Broekaart, Nieuw-Namen (NL); Robert Dirk Van De Grampel, Tholen (NL); David Del Agua Hernandez, Murcia (ES); Ignacio Vic Fernandez, Murcia (ES)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 55 days.

(21) Appl. No.: 16/061,427

(22) PCT Filed: Dec. 12, 2016

(86) PCT No.: PCT/IB2016/057548
§ 371 (c)(1),
(2) Date: Jun. 12, 2018

(87) PCT Pub. No.: WO2017/103764
PCT Pub. Date: Jun. 22, 2017

(65) Prior Publication Data
US 2019/0382557 A1    Dec. 19, 2019

(30) Foreign Application Priority Data
Dec. 16, 2015  (EP) ...................... 15382633

(51) Int. Cl.
| | | |
|---|---|---|
| *C08K 5/42* | (2006.01) | |
| *C08K 5/3475* | (2006.01) | |
| *C08K 5/3492* | (2006.01) | |
| *C08K 5/50* | (2006.01) | |
| *C08K 5/523* | (2006.01) | |
| *C08K 5/526* | (2006.01) | |
| *C08K 5/5393* | (2006.01) | |
| *G02B 1/04* | (2006.01) | |
| *C08G 64/22* | (2006.01) | |
| *C08L 69/00* | (2006.01) | |
| *C08K 5/5333* | (2006.01) | |
| *C08K 3/32* | (2006.01) | |
| *C08K 3/30* | (2006.01) | |
| *B29C 45/00* | (2006.01) | |
| *B29K 69/00* | (2006.01) | |
| *B29K 105/00* | (2006.01) | |

(52) U.S. Cl.
CPC ............... *C08K 5/42* (2013.01); *C08G 64/22* (2013.01); *C08K 3/30* (2013.01); *C08K 3/32* (2013.01); *C08K 5/3475* (2013.01); *C08K 5/3492* (2013.01); *C08K 5/50* (2013.01); *C08K 5/523* (2013.01); *C08K 5/526* (2013.01); *C08K 5/5333* (2013.01); *C08K 5/5393* (2013.01); *C08L 69/00* (2013.01); *G02B 1/041* (2013.01); *G02B 1/045* (2013.01); *B29C 45/0001* (2013.01); *B29K 2069/00* (2013.01); *B29K 2105/0044* (2013.01); *C08K 2003/329* (2013.01)

(58) Field of Classification Search
CPC .......... C08K 3/32; C08K 5/5333; C08K 5/42; C08K 3/30; C08K 5/5393; C08K 5/3492; C08K 5/523; C08K 5/3475; C08K 5/526; C08K 5/50; C08K 2003/329; G02B 1/041; G02B 1/045; C08L 69/00; C08G 64/22; B29C 45/0001; B29K 2105/0044; B29K 2069/00
USPC .......................................................... 524/91
See application file for complete search history.

(56) References Cited

U.S. PATENT DOCUMENTS

| | | |
|---|---|---|
| 5,276,109 A | 1/1994 | Sakashita et al. |
| 6,399,739 B1 | 6/2002 | McCloskey et al. |
| 7,786,246 B2 | 8/2010 | Jansen et al. |
| 2005/0009968 A1 | 1/2005 | Singh et al. |
| 2007/0100038 A1 | 5/2007 | Glasgow et al. |
| 2007/0225415 A1 | 9/2007 | Bar-Yaakov et al. |
| 2007/0225416 A1 | 9/2007 | Faber et al. |
| 2009/0054586 A1 | 2/2009 | Hein et al. |
| 2009/0088504 A1 | 4/2009 | Chatterjee et al. |
| 2011/0071241 A1 | 3/2011 | Rogunova et al. |
| 2012/0157587 A1 | 6/2012 | Meyer et al. |

(Continued)

FOREIGN PATENT DOCUMENTS

| | | |
|---|---|---|
| CN | 102459459 A | 5/2012 |
| CN | 104837924 A | 8/2015 |

(Continued)

OTHER PUBLICATIONS

International Patent Application No. PCT/IB2016/057548; Int'l Search Report and the Written Opinion; dated Mar. 14, 2017; 14 pages.

(Continued)

*Primary Examiner* — Angela C Scott
(74) *Attorney, Agent, or Firm* — Cantor Colburn LLP

(57) ABSTRACT

A molded article includes a polycarbonate resin, an ultraviolet (UV) absorbing component, a heat stabilizer component and an acid stabilizer component. The polycarbonate resin is produced by an interfacial polymerization process and has an end-cap level of at least about 98%, and includes a ratio of bound UV absorbing component to free UV absorbing component of less than about 1.0 when molded under abusive molding conditions. The polycarbonate resin may include high purity polycarbonate. The acid stabilizer component may include a sulfonic acid ester. Methods of forming molded articles are also described.

17 Claims, 1 Drawing Sheet

(56) References Cited

U.S. PATENT DOCUMENTS

| | | |
|---|---|---|
| 2012/0172497 A1 | 7/2012 | Chi et al. |
| 2013/0035441 A1* | 2/2013 | de Brouwer .............. C08J 5/18 |
| | | 524/611 |
| 2013/0225763 A1 | 8/2013 | Pai-Paranjape et al. |
| 2013/0270591 A1 | 10/2013 | De Brouwer et al. |
| 2014/0094545 A1 | 4/2014 | Roncaglia et al. |
| 2014/0178665 A1 | 6/2014 | Morizur et al. |
| 2014/0194561 A1 | 7/2014 | Ganguly et al. |
| 2014/0242364 A1* | 8/2014 | Meyer .................... C08L 69/00 |
| | | 428/216 |
| 2014/0275382 A1 | 9/2014 | Ishida |
| 2019/0284365 A1 | 9/2019 | Eggenhuisen et al. |
| 2019/0284390 A1 | 9/2019 | Eggenhuisen et al. |
| 2020/0377720 A1 | 12/2020 | Eggenhuisen et al. |

FOREIGN PATENT DOCUMENTS

| | | |
|---|---|---|
| EP | 0683200 A1 | 11/1995 |
| EP | 1566396 A1 | 8/2005 |
| EP | 2371877 A1 | 10/2011 |
| EP | 2677002 A1 | 12/2013 |
| EP | 2730618 A1 | 5/2014 |
| JP | 04328124 A | 4/1991 |
| JP | 04328156 A | 11/1992 |
| JP | 04356559 A | 12/1992 |
| JP | 1025408 A | 1/1998 |
| KR | 101385035 | 4/2014 |
| WO | 0177227 A1 | 10/2001 |
| WO | 2016044218 A1 | 3/2016 |
| WO | 2017203493 A1 | 11/2017 |

OTHER PUBLICATIONS

International Patent Application No. PCT/IB2016/057548; Int'l Preliminary Report on Patentability; dated Jun. 28, 2018; 9 pages.
BASF; "Tinuvin 360 Very Low Volatile Benzotriazole UV Absorber Technical Information"; Aug. 2010; pp. 1-3.
PubChem; "1,4-Bis((2,6-diethyl-methylphenyl)amino)anthraquinone Compound Summary"; Retrieved Sep. 30, 2019; pp. 1-11.

* cited by examiner

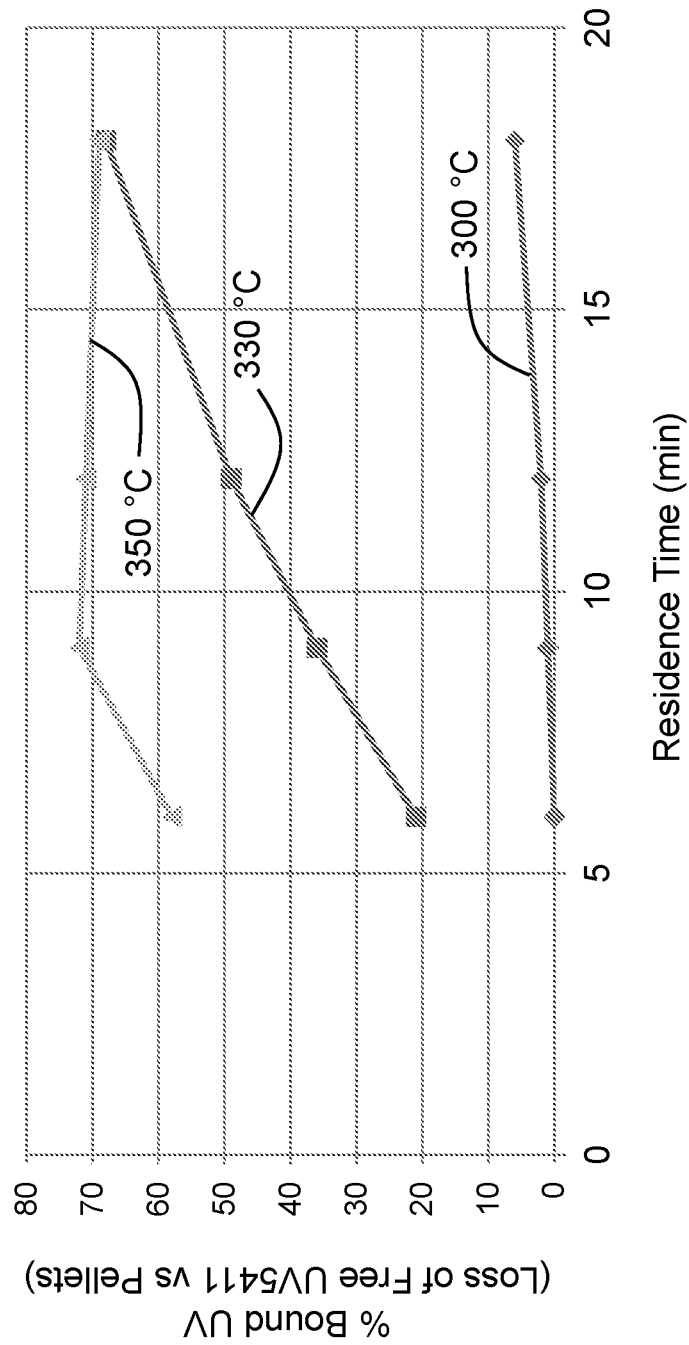

ABUSIVELY MOLDED ARTICLE INCLUDING UV-STABLE POLYCARBONATE

CROSS-REFERENCE TO RELATED APPLICATION

This application is the National Stage of International Application No. PCT/IB2016/057548, filed Dec. 12, 2016, which claims the benefit of European Application No. 15382633.4 filed Dec. 16, 2015, the disclosures of which are incorporated herein by this reference in their entireties.

FIELD OF THE DISCLOSURE

The present disclosure relates to injection-molded articles, and in particular injection molded articles including a polycarbonate resin that retain desirable physical properties after processing under high heat conditions.

BACKGROUND OF THE DISCLOSURE

Polycarbonates are used in a wide variety of applications because they exhibit a good balance of properties, including moldability, mechanical properties (e.g., impact strength) and transparency. For outdoor applications, a UV stabilizer is added to the polycarbonate to improve its weatherability when exposed to light containing UV radiation. The UV absorbing component absorbs the UV radiation and dissipates its energy via unreactive pathways, which stabilizes the polycarbonate and prevents yellowing of the molded article.

Typical molding conditions for molded polycarbonate articles such as those used in automotive lighting lens (e.g., headlamp) and other applications utilize maximum temperatures of from about 280-290 degrees Celsius (° C.). Polycarbonate resin, which is a desirable material for such applications because of its high transparency and good impact properties, can be injection molded into many useful articles at these temperatures. Increasing demands for more highly shaped and lighter weight articles (i.e., articles having a reduced wall thickness), however, result in a need to increase the temperature of the polycarbonate resin during molding so that it has sufficient flow (low enough viscosity) to fill the entire mold. In addition, it may be desirable to increase the amount of time that the polycarbonate resin is held at these elevated temperatures to ensure that the polycarbonate is set in the mold. This may be particularly desirable in multicomponent (e.g., 2-component or 2K) molding applications.

One particular challenge when injection molding articles at elevated temperatures and/or for longer residence times is that these temperatures and/or times may result in decomposition of the polycarbonate resin. Decomposition of polycarbonate resin can result in the molded article having several undesirable properties, including but not limited to color change (e.g., yellowing), reduction in mechanical properties (e.g., impact strength), loss of chemical resistance, and reduced weatherability. Even when processed at standard (e.g., 280-290° C.) temperatures, injection-molded polycarbonate articles can have some of these undesirable properties. To minimize this, the polycarbonate resin typically includes a heat stabilizer, a release agent and a UV absorber. To ensure that the molded article including these components has a stable color following processing, they should be stable under the processing conditions to avoid yellowing from decomposition of the components. A minimum level of free UV absorber is desirable to ensure long-term stability during weathering in outdoor applications.

Typical UV absorbers used in polycarbonate molding applications are of the benzotriazole type, which are readily available, have a low absorption to visible light and have a low cost. These benzotriazole UV absorbers, however, contain a reactive —OH group, which has a tendency to react with the polycarbonate chain, leading to loss of UV absorption functionality. Benzotriazole absorbers having bulky side groups are less susceptible to reaction of the reactive —OH group, but tend to have more absorption in the visible range, which leads to a molded article having a yellow color. As a result, such absorbers are not preferred. UV absorbers having functional groups other than those in the benzotriazole class (such as hydrazines and triazines) can also contain reactive groups that decompose upon processing, leading to discoloration. Color stability upon processing can typically be improved by adding a heat stabilizer (including but not limited to phosphite and triphenylphosphine compounds), but they may not prevent reactivity of the UV absorber with the polycarbonate chain.

Other options to accommodate the market trend is to improve the flow of the polycarbonate at lower temperatures by reducing the molecular weight of the polycarbonate. This also results in decreased mechanical properties (e.g., impact strength) and chemical resistance, however, and is undesirable for many molding applications.

These and other shortcomings are addressed by aspects of the present disclosure.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 is a graph showing the level of bound UV absorbing component in samples as a function of processing conditions.

SUMMARY

Aspects of the disclosure relate to a molded article including a polycarbonate resin, an ultraviolet (UV) absorbing component, a heat stabilizer component and an acid stabilizer component. The polycarbonate resin is produced by an interfacial polymerization process and has an endcap level of at least about 98%. The molded article includes a ratio of bound UV absorbing component to free UV absorbing component of less than about 1.0 when molded under abusive molding conditions.

In other aspects a method for forming a molded article includes: combining a polycarbonate resin produced by an interfacial polymerization process and having an endcap level of at least about 98%, a UV absorbing component, a heat stabilizer component and an acid stabilizer component to form a mixture; and forming a molded article from the mixture by molding the mixture under abusive molding conditions. The molded article includes a ratio of bound UV absorbing component to free UV absorbing component of less than about 1.0 when molded under abusive molding conditions.

DETAILED DESCRIPTION

The present disclosure can be understood more readily by reference to the following detailed description of the disclosure and the Examples included therein. In various aspects, the present disclosure pertains to molded articles including a polycarbonate resin, an ultraviolet (UV) absorbing component, a heat stabilizer component and an acid stabilizer component. In certain aspects the molded article includes a ratio of bound UV absorbing component to free UV absorbing component of less than about 1.0 when molded under abusive molding conditions, and the polycarbonate resin is produced by an interfacial polymerization process and has an endcap level of at least about 98%.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional additive materials" means that the additional additive materials can or cannot be substituted and that the description includes molded articles that both include and do not include additional additive materials.

As used herein, the term "effective amount" refers to an amount that is sufficient to achieve the desired modification of a physical property of the composition or material. For example, an "effective amount" of a heat stabilizer component refers to an amount that is sufficient to achieve the desired improvement in the property modulated by the formulation component, e.g. achieving the desired level of UV absorbing component stability and/or color stability. The specific level in terms of wt % in a composition required as an effective amount will depend upon a variety of factors including the amount and type of polycarbonate, amount and type of other components, and end use of the article made using the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

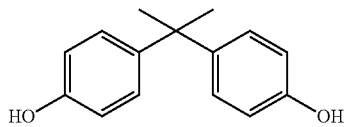 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Certain abbreviations are defined as follows: "g" is grams, "kg" is kilograms, "° C." is degrees Celsius, "min" is minutes, "mm" is millimeter, "mPa" is megapascal, "WiFi" is a system of accessing the internet from remote machines, "GPS" is Global Positioning System—a global system of U.S. navigational satellites which provide positional and velocity data. "LED" is light-emitting diode, "RF" is radio frequency, and "RFID" is radio frequency identification.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Abusively Molded Article Including UV-Stable Polycarbonate

Aspects of the present disclosure relate to a molded article including a polycarbonate resin, an ultraviolet (UV) absorbing component, a heat stabilizer component, and an acid stabilizer component. In certain aspects the molded article includes a ratio of bound UV absorbing component to free UV absorbing component of less than about 1.0 when molded under abusive molding conditions. In further aspects the polycarbonate resin is produced by an interfacial polymerization process and has an endcap level of at least about 98%.

It has been found that UV absorbing component retention in an abusively molded article including a polycarbonate resin can be enhanced by including a heat stabilizer component and an acid stabilizer component in the resin. The heat stabilizer component and acid stabilizer component prevent attachment of the UV absorbing component to the polycarbonate chain, which reduces the level of bound UV absorbing component. In other words, the abusively molded article retains a higher level of free UV absorbing component. Further, contrary to previously known polycarbonate resin-containing molded articles, molded articles according to the present disclosure including the heat stabilizer component and acid stabilizer component retain their molecular weight better during the abusive molding process.

Abusive molding conditions relate to the maximum temperature at which the article is molded and the amount of time the article is held at that maximum temperature. As noted above, while typical molding conditions for molded polycarbonate articles such as those used in automotive lighting (e.g., headlamp) and other applications utilize maximum temperatures of from about 280-290° C., in some applications it is desirable to increase the molding temperatures to at least about 330° C. up to at least about 360° C. In addition, it may be desirable to increase the amount of time that the polycarbonate resin is held at these elevated temperatures: while in standard molding applications residence times may be about 6 minutes or less, they may need to be increased to up to about 12 to 15 minutes in certain applications. Such abusive molding conditions can result in attachment of the UV absorbing component to the polycarbonate chain, which ultimately results in the molded article having undesirable properties (as discussed above). Aspects of the disclosure, which relate to polycarbonate resin-based molded articles including both a heat stabilizer component and acid stabilizer component, address this shortcoming. In certain aspects, the abusive molding conditions include molding the article at a maximum temperature of at least about 330° C. at a residence time of at least about 10 minutes, or at a maximum temperature of at least about 330°

C. at a residence time of at least about 12 minutes, or at a maximum temperature of at least about 330° C. at a residence time of at least about 15 minutes, or at a maximum temperature of at least about 340° C. at a residence time of at least about 6 minutes, or at a maximum temperature of at least about 340° C. at a residence time of at least about 10 minutes, or at a maximum temperature of at least about 350° C. at a residence time of at least about 6 minutes, or at a maximum temperature of at least about 350° C. at a residence time of at least about 10 minutes, or at a maximum temperature of at least about 350° C. at a residence time of at least about 15 minutes, or even at a maximum temperature of at least about 360° C. at a residence time of at least about 3 minutes. In a more particular aspect the abusive molding conditions include molding the article at a maximum temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes. In a certain aspect the abusive molding conditions include molding the article at a maximum temperature of at least about 350° C. at a residence time of at least about 15 minutes.

As discussed, in some aspects of the disclosure the polycarbonate resin has an endcap level of at least about 98%. Polycarbonate resins having this endcap level may generally be produced by an interfacial polymerization process. Purely by way of example, in one particular interfacial polymerization process in which the polycarbonate is BPA polycarbonate, the BPA polycarbonate is produced by amine catalyzed interfacial polycondensation of bisphenol A and phosgene. In contrast to other known methods for forming polycarbonates (such as melt transesterification processes) in which the polycarbonate has an endcap level of less than about 98%, polycarbonates formed by interfacial polymerization are characterized as having an endcap level of at least about 98%. In some aspects, the polycarbonate resin has an endcap level of at least about 99%. In further aspects, the polycarbonate resin is substantially fully endcapped.

Suitable polycarbonates for use in molded articles according to the present disclosure include but are not limited to bisphenol A, a polycarbonate copolymer, polyester carbonate polymer, or polycarbonate-polysiloxane copolymer, or combinations thereof.

In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions having repeating structural units of the formula (1):

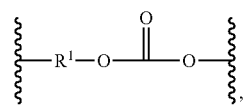  (1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

$$-A^1-Y^1-A^2-\qquad(2),$$

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

In addition to the polycarbonates described above, combinations of the polycarbonate with other thermoplastic polymers, for example combinations of homopolycarbonates and/or polycarbonate copolymers, can be used.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate or polyester carbonate. Such copolymers further contain carbonate units derived from oligomeric ester-containing dihydroxy compounds (also referred to herein as hydroxy end-capped oligomeric acrylate esters).

In various further aspects, "polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like.

In a further aspect, the polycarbonate resin includes a polyester-polycarbonate copolymer, and specifically a polyester-polycarbonate copolymer including ester units that comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In a still further aspect, the $C_{6-20}$ aliphatic dicarboxylic acid ester unit includes a straight chain alkylene group comprising methylene (—CH$_2$—) repeating units.

All types of polycarbonate end groups are contemplated as being useful in the polycarbonate composition, provided that such end groups do not significantly adversely affect desired properties of the compositions.

In a further aspect, the polycarbonate polymer is a homopolymer. In a still further aspect, the homopolymer comprises repeating units derived from bisphenol A.

In a still further aspect, the polycarbonate component is a copolymer. In a still further aspect, the copolymer comprises repeating units derived from BPA. In yet a further aspect, the copolymer comprises repeating units derived from sebacic acid. In an even further aspect, the copolymer comprises repeating units derived from sebacic acid and BPA. Useful polycarbonate copolymers are commercially available and include, but are not limited to, those marketed under the trade names LEXAN® EXL and LEXAN® HFD polymers, and are available from SABIC Innovative Plastics (formerly GE Plastics).

In some aspects of the disclosure, the polycarbonate resin is a high purity polycarbonate resin. High purity polycarbonate resins are generally characterized as having a purity of at least about 99.70%, a hydroxyl content less than 100 parts per million (ppm) by weight, and which contains less than 2 ppm sulfur, although other purity criteria could be applied. In certain aspects the polycarbonate resin included in molded articles of the disclosure is produced from a bisphenol A polymer having a purity of at least about 99.70%, a hydroxyl content less than 100 ppm by weight, and which contains less than 2 ppm sulfur.

Aspects of the disclosure relate to molded articles that include a UV absorbing component. In certain aspects, the UV absorbing component is a benzotriazole compound, a triazine compound, or a combination thereof. Examples of suitable UV absorbing components include, but are not limited to 2-(2'-Hydroxy-5'-t-octylphenyl) benzotriazole (e.g., CYASORB® UV5411, available from Cytec Industries) (UV5411), 2-(2 hydroxy-3,5 dicumyl) benzotriazole (e.g., Tinuvin® 234, available from BASF) (UVA 234), phenol, 2,2'-methylenebis(6-(2H-benzotriazol-2-yl)-4-(1,1,3,3-tetramethylbutyl)- (e.g., Tinuvin® 360, available from BASF) (LA31RG/T360), phenol, 2-(4,6-diphenyl-1,3,5-triazin-2-yl)-5-(hexyloxy)- (e.g., Tinuvin® 1577, available from BASF) (T1577), 1,3-Bis((2-cyano-3,3-diphenylacryloyl)oxy)-2,2-bis(((2-cyano-3,3-diphenylacryloyl)oxy) methyl)propane (e.g., Uvinul® 3030, available from BASF) (UV3030), and combinations thereof. In particular aspects, the UV absorbing component is 2-(2'-Hydroxy-5'-t-octylphenyl) benzotriazole, 2-(2 hydroxy-3,5 dicumyl) benzotriazole, phenol, 2,2'-methylenebis(6-(2H-benzotriazol-2-yl)-4-(1,1,3,3-tetramethylbutyl)-, or a combination thereof.

Any effective amount of UV absorbing component can be included in the molded article. In some aspects the UV absorbing component is present in the molded article in an amount of from about 0.01 to about 1.0 weight percent (wt %) of the composition, or in certain aspects in an amount of from about 0.10 to about 0.50 wt % of the composition, or even in an amount of from about 0.10 to about 0.30 wt % of the composition.

The heat stabilizer component stabilizes the polycarbonate resin in the molded article by improving color stability upon heat processing. In some aspects the heat stabilizer component includes at least one organophosphorous compound, including but not limited to a phosphite, phosphine or phosphonite compound. In particular aspects, the heat stabilizer component includes tris-(2,4-di-tert-butylphenyl) phosphite (e.g., IRGAFOS® 168, available from BASF) (IRG), triphenylphosphine (TPP), tridecylphosphite (TDP), tetrakis(2,4-di-tert-butylphenyl)-4,4-diphenyldiphosphonite) (PEPQ), bis(2,4-dicumylphenyl) pentaerythritol diphosphite (e.g., Doverphos S-9228, available from Dover Chemical) (DP), diphenyl monodecyl phosphite (DPDP), or combinations thereof. In certain specific aspects the heat stabilizer component includes PEPQ, DP, TDP, DPDP or a combination thereof, or even PEPQ, DP, or a combination thereof. In other specific aspects the heat stabilizer component includes IRG, TPP, or a combination thereof.

Any effective amount of heat stabilizer component can be included in the molded article. In some aspects the heat stabilizer component is present in the molded article in an amount of from about 0.01 to about 0.2 wt % of the composition, or in certain aspects in an amount of from about 0.01 to about 0.08 wt % of the composition.

The acid stabilizer component in some aspects contributes to stabilizing the UV absorbing component in the molded article, preventing or minimizing binding of the UV absorbing component to the polycarbonate chain when subjected to abusive molding. In certain aspects the acid stabilizer component includes a sulfonic acid ester. In particular aspects the acid stabilizer component includes butyl tosylate (e.g., butyl p-toluenesulfonate, or BuTos). In other aspects the acid stabilizer component includes an organophosphorous compound, including but not limited to phosphorous acid, phosphoric acid, or a combination thereof. In yet further aspects the acid stabilizer component includes a sulfonic acid ester in combination with an organophosphorous component.

Any effective amount of acid stabilizer component can be included in the molded article. In some aspects the acid stabilizer component is present in the molded article in an amount of from about 0.5 to about 10 ppm in the composition, or in certain aspects in an amount of from about 0.5 to about 6 ppm in the composition.

While the molded article has been described thus far as including both a heat stabilizer component and an acid stabilizer component, in some aspects the molded article need not include an acid stabilizer component provided the heat stabilizer component sufficiently prevents or minimizes binding of the UV absorbing component to the polycarbonate resin following abusive molding. Suitable heat stabilizer components that may sufficiently protect the UV absorbing component include, but are not necessarily limited to, one or more of the following organophosphorous compounds: TDP, PEPQ, DP and DPDP. In such aspects the molded article would thus include a polycarbonate resin, an ultraviolet (UV) absorbing component, and a heat stabilizer component including one or more of TDP, PEPQ, DP and DPDP. In other aspects the molded article includes PEPQ, DP or combinations thereof. The polycarbonate resin is produced by an interfacial polymerization process and has an endcap level of at least about 98%, and the molded article includes a ratio of bound UV absorbing component to free UV absorbing component of less than about 1.0 when molded under abusive molding conditions.

Molded articles according to aspects described herein include a ratio of bound UV absorbing component to free UV absorbing component of less than about 1.0 when molded under abusive molding conditions. In more specific aspects, the molded article includes a ratio of bound UV absorbing component to free UV absorbing component of less than about 0.66 when molded under abusive molding conditions, or includes a ratio of bound UV absorbing component to free UV absorbing component of less than about 0.33 when molded under abusive molding conditions, or even includes a ratio of bound UV absorbing component to free UV absorbing component of less than about 0.17 when molded under abusive molding conditions.

In some aspects, molded articles according to aspects described herein include at least 60% unbound UV absorbing component when molded under abusive molding conditions. In further aspects, the molded article includes at least 70% unbound UV absorbing component when molded under abusive molding conditions, or includes at least 80% unbound UV absorbing component when molded under abusive molding conditions, or even includes at least 90% unbound UV absorbing component when molded under abusive molding conditions.

In addition to the foregoing components, the disclosed molded articles can optionally include an effective amount of one or more additional additive materials ordinarily incorporated in polycarbonate resin compositions of this type, with the proviso that the additives are selected so as to not significantly adversely affect the desired properties of the polycarbonate resin composition. Combinations of additives can be used. Such additives can be combined with the other components at a suitable time during the mixing of the components prior to or during molding Exemplary and non-limiting examples of additive materials that can be present in the disclosed molded article include additional reinforcing fillers, an acid scavenger, anti-drip agent, antioxidant, antistatic agent, chain extender, colorant (e.g., pigment and/or dye), de-molding agent, flow promoter, lubricant, mold release agent, plasticizer, quenching agent, flame retardant stabilizer (including for example a thermal stabilizer, a hydrolytic stabilizer, or a light stabilizer), UV reflecting additive, or any combination thereof.

In particular aspects, the molded article includes additional additive materials, including a phenolic heat stabilizer component (e.g., Irganox® 1076, available from BASF), a carboxylic acid ester (e.g., PETS), or a combination thereof.

Molded articles formed under abusive molding conditions according to aspects described herein may exhibit several improved properties over previously known molded articles (in addition to the reduced UV absorbing component binding described above). Properties of such molded articles include, but are not limited to, reduced polycarbonate molecular weight loss following abusive molding, improved yellowing index (ΔYI) following abusive molding, and reduced ΔYI following weathering.

In certain aspects, the molded article the polycarbonate resin exhibits a molecular weight loss of less than about 10% as compared to the molecular weight of the polycarbonate resin prior to the abusive molding.

In some aspects the abusively molded article, when tested in accordance with ASTM D1925 (1988) using a 2.5 mm thick plaque, has a yellowing index (YI) less than about 4.0, or a YI of less than about 3.5, or a YI of less than about 3.0, or a YI of less than about 2.5, or even a YI of less than about 2.0. In further aspects the abusively molded article, when tested in accordance with ASTM D1925 (1988) using a 2.5 mm thick plaque, has a yellowing index (YI) of from about 1.0 to about 2.5.

In certain aspects the abusively molded article, when tested in accordance with ASTM D1925 (1988) using a 2.5 mm thick plaque, exhibits an increase in YI of less than about 4.0 after 2000 hours of heat aging at 120° C., or an increase in YI of less than about 3.5 after 2000 hours of heat aging at 120° C., or an increase in YI of less than about 3.0 after 2000 hours of heat aging at 120° C., or an increase in YI of less than about 2.5 after 2000 hours of heat aging at 120° C., or an increase in YI of less than about 2.0 after 2000 hours of heat aging at 120° C. In further aspects the abusively molded article, when tested in accordance with ASTM D1925 (1988) using a 2.5 mm thick plaque, exhibits an increase in YI of from about 1.0 to about 4.0 after 2000 hours of heat aging at 120° C. The increase in YI is compared to a molded article having the same components, and the same amounts of components, that has not been heat aged.

In further aspects the molded article, when tested in accordance with ASTM D1925 (1988), has a change in yellowing index (ΔYI) of less than about 1.10 after abusive molding, or a ΔYI of less than about 1.0 after abusive molding, or a ΔYI of less than about 0.90 after abusive molding, or a ΔYI of less than about 0.75 after abusive molding, or a ΔYI of less than about 0.60 after abusive molding, or a ΔYI of less than about 0.50 after abusive molding, or a ΔYI of less than about 0.35 after abusive molding. The ΔYI is compared to a molded article having the same components, and the same amounts of components, that has not been subjected to abusive molding conditions.

In other aspects the molded article, when weathered in accordance with ISO 11341:2004 for 2000 hours, has a ΔYI of less than about 8.0, or a ΔYI of less than about 7.0, or a ΔYI of less than about 6.0, or a ΔYI of from about 5.0 to about 8.0. The ΔYI is compared to a molded article having the same components, and the same amounts of components, that has not been weathered.

Methods for Forming Abusively Molded Article Including UV-Stable Polycarbonate

The present disclosure also relates to methods for forming UV-stable polycarbonate-containing molded articles. In one aspect, a method for forming a molded article includes: combining a polycarbonate resin produced by an interfacial polymerization process and having an endcap level of at least about 98%, a UV absorbing component, a heat stabilizer component and an acid stabilizer component to form a mixture; and forming a molded article from the mixture by molding the mixture under abusive molding conditions. The molded article includes a ratio of bound UV absorbing component to free UV absorbing component of less than about 1.0. In some aspects the abusive molding conditions include molding the article at the maximum temperatures and residence times described above. In particular aspects the abusive molding conditions include molding the article at a maximum temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes.

In some aspects the mixture has a melt flow rate of from about 15 to about 30 cubic centimeters ($cm^3$)/10 min. Melt flow rate may be determined according to ISO 1133:2005 (Determination of the melt mass-flow rate (MFR) and the melt volume-flow rate (MVR) of thermoplastics), at a temperature of 300° C., a load of 1.2 kilograms (kg) and a dwell time of 300 seconds. In particular aspects, the mixture has a melt flow rate of from about 15 to about 25 $cm^3$/10 min, or even a melt flow rate of from about 18 to about 22 $cm^3$/10 min.

Other aspects of the method include selection of a polycarbonate resin, UV absorbing component, heat stabilizer component, acid stabilizer component and optional additional additive component such as those described above. The method also relates to forming a molded article that does not include an acid stabilizer component according to aspects described herein.

Molded articles according to aspects of the disclosure described herein may be applicable for use in a wide variety of applications, including but not limited to automotive lighting lens (e.g., headlamp) applications. For example, in automotive lighting lens applications the molded articles may be a head lamp cover, a head lamp lens, an inner lens, a fog lamp lens, a rear lamp lens, a rear lamp inner lens or an interior lamp lens. In other applications the molded article is suitable for use in light guide, automotive glazing or window applications.

Molded articles according to aspects of the disclosure described herein may further be applicable for use in high shear molding conditions. High shear molding conditions are in some aspects similar to abusive molding conditions. High shear molding conditions may be identified by performance under particular molding conditions, including mold thickness and mold fill rate. Mold fill rate is affected by processing parameters such as gate design (small gates result in higher shear), injection speed (higher speeds result in higher shear), material viscosity, and melt temperature. Particular examples of molded articles according to aspects of the disclosure that may be formed under high shear molding conditions include, but are not limited to, sheets or extruded profiles used for glazing applications (e.g., residential glazing applications) or greenhouses.

Aspects of the Disclosure

In various aspects, the present disclosure pertains to and includes at least the following aspects.

Aspect 1: A molded article comprising:
a polycarbonate resin produced by an interfacial polymerization process and having an endcap level of at least about 98%;
an ultraviolet (UV) absorbing component;
a heat stabilizer component; and
an acid stabilizer component,
wherein the molded article comprises a ratio of bound UV absorbing component to free UV absorbing component of less than about 1.0 when molded under abusive molding conditions.

Aspect 2: The molded article of aspect 1, wherein the acid stabilizer component comprises a sulfonic acid ester.

Aspect 3: The molded article of aspect 2, wherein the sulfonic acid ester comprises butyl p-toluenesulfonate.

Aspect 4: The molded article according to any of the previous aspects, wherein the acid stabilizer component comprises phosphorous acid, phosphoric acid, or a combination thereof.

Aspect 5: The molded article according to any of the previous aspects, wherein the article comprises an automotive lighting lens.

Aspect 6: The molded article according to any of aspects 1 to 4, wherein the article comprises a head lamp cover, a head lamp lens, an inner lens, a fog lamp lens, a rear lamp lens, a rear lamp inner lens, an interior lamp lens, or is suitable for use in light guide, automotive glazing or window applications.

Aspect 7: The molded article according to any of the previous aspects, wherein the UV absorbing component comprises a benzotriazole compound, a triazine compound, or a combination thereof.

Aspect 8: The molded article according to any of the previous aspects, wherein the UV absorbing component comprises 2-(2'-Hydroxy-5'-t-octylphenyl) benzotriazole, 2-(2 hydroxy-3,5 dicumyl) benzotriazole, phenol, 2,2'-methylenebis(6-(2H-benzotriazol-2-yl)-4-(1,1,3,3-tetramethylbutyl)-, or a combination thereof.

Aspect 9: The molded article according to any of the previous aspects, wherein the heat stabilizer component comprises tris-(2,4-di-tert-butylphenyl) phosphite, triphenylphosphine, or a combination thereof.

Aspect 10: The molded article according to any of the previous aspects, wherein the acid stabilizer component comprises from about 0.5 to about 10 ppm in the composition.

Aspect 11: The molded article according to any one of the previous aspects, wherein the polycarbonate resin is produced from a bisphenol A polymer having a purity of at least about 99.70%, a hydroxyl content less than 100 ppm by weight, and which contains less than 2 ppm sulfur.

Aspect 12: The molded article according to any of the previous aspects, wherein the polycarbonate resin exhibits a molecular weight loss of less than about 10% as compared to the molecular weight of the polycarbonate resin prior to the abusive molding.

Aspect 13: The molded article according to any of the previous aspects, wherein the molded article comprises a ratio of bound UV absorbing component to free UV absorbing component of less than about 0.66 when molded under abusive molding conditions.

Aspect 14: The molded article according to any of the previous aspects, wherein the molded article comprises a ratio of bound UV absorbing component to free UV absorbing component of less than about 0.33 when molded under abusive molding conditions.

Aspect 15: The molded article according to any of the previous aspects, wherein the molded article comprises a ratio of bound UV absorbing component to free UV absorbing component of less than about 0.17 when molded under abusive molding conditions.

Aspect 16: The molded article according to any of the previous aspects, wherein the abusive molding conditions comprise a maximum molding temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes.

Aspect 17: The molded article according to any of the previous aspects, wherein the molded article, when tested in accordance with ASTM D1925 (1988) using a 2.5 mm thick plaque, has a yellowing index (YI) less than about 4.0, or a YI of less than about 3.5, or a YI of less than about 3.0, or a YI of less than about 2.5, or a YI of less than about 2.0, or a YI of from about 1.0 to about 2.5.

Aspect 18: The molded article according to any of the previous aspects, wherein the molded article, when tested in accordance with ASTM D1925 (1988) using a 2.5 mm thick plaque, exhibits an increase in YI of less than about 4.0 after 2000 hours of heat aging at 120° C., or an increase in YI of less than about 3.5 after 2000 hours of heat aging at 120° C., or an increase in YI of less than about 3.0 after 2000 hours of heat aging at 120° C., or an increase in YI of less than about 2.5 after 2000 hours of heat aging at 120° C., or an increase in YI of less than about 2.0 after 2000 hours of heat aging at 120° C., or an increase in YI of from about 1.0 to about 4.0 after 2000 hours of heat aging at 120° C.

Aspect 19: A molded article comprising:
a polycarbonate resin produced by an interfacial polymerization process and having an endcap level of at least about 98%;
an ultraviolet (UV) absorbing component; and
a heat stabilizer component comprising tetrakis(2,4-di-tert-butylphenyl)-4,4-diphenyldiphosphonite), bis(2,4-dicumylphenyl) pentaerythritol diphosphate, tridecylphosphite, diphenyl monodecyl phosphite or combinations thereof, wherein the molded article comprises a ratio of bound UV absorbing component to free UV absorbing component of less than about 1.0 when molded under abusive molding conditions.

Aspect 20: A method for forming a molded article, comprising:

combining a polycarbonate resin produced by an interfacial polymerization process and having an endcap level of at least about 98%, a UV absorbing component, a heat stabilizer component and an acid stabilizer component to form a mixture; and forming a molded article from the mixture by molding the mixture under abusive molding conditions, wherein the molded article comprises a ratio of bound UV absorbing component to free UV absorbing component of less than about 1.0.

Aspect 21: The method according to aspect 20, wherein the mixture has a melt flow rate of from about 15 to about 30 cm$^3$/10 min when tested in accordance with ISO 1133: 2005 at a temperature of 300° C., a load of 1.2 kilograms (kg) and a dwell time of 300 seconds, or a melt flow rate of from about 15 to about 25 cm$^3$/10 min, or a melt flow rate of from about 18 to about 22 cm$^3$/10 min.

Aspect 22: The molded article according to any of the previous aspects, wherein the molded article is formed under high shear molding conditions.

Aspect 23: The molded article according to any of the previous aspects, wherein the molded article is formed under high shear molding conditions and is a sheet or extruded profile used for glazing applications or greenhouses.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described and evaluated herein.

TABLE 1

| Resins (Table 1A) | | |
|---|---|---|
| Component | Chemical Description | Source, Vendor |
| PC1 | Linear Bisphenol A Polycarbonate, produced via interfacial polymerization, Mw of about 30,000 grams per mole (g/mol) as determined by GPC using polycarbonate standards, phenol end-capped (at least 98%) | SABIC |
| PC2 | Linear Bisphenol A Polycarbonate, produced via interfacial polymerization, Mw of about 21,800 g/mol as determined by GPC using polycarbonate standards, para-cumylphenyl (PCP) end-capped (at least 98%) | SABIC |
| PC3 | Linear Bisphenol A Polycarbonate, produced via interfacial polymerization, Mw of about 30,000 g/mol as determined by GPC using polycarbonate standards, phenol end-capped (at least 98%), produced with BPA of at least 99.70% purity and having less than 2 ppm sulfur | SABIC |
| PC4 | Linear Bisphenol A Polycarbonate, produced via interfacial polymerization, Mw of about 21,800 g/mol as determined by GPC using polycarbonate standards, para-cumylphenyl (PCP) end-capped (at least 98%), produced with BPA of at least 99.70% purity and having less than 2 ppm sulfur | SABIC |

| Additives (Table 1B) | | |
|---|---|---|
| Abbreviation/ Brand Name | Chemical Name | CAS No. |
| IRGAFOS 168 (IRG) | Tris-(2,4-di-tert-butylphenyl) phosphite | 31570-04-4 |
| PEPQ | Tetrakis(2,4-di-tert-butylphenyl)-4,4-diphenyldiphosphonite) | 119345-01-6 |
| Doverphos S-9228 (DP) | Bis (2,4-dicumylphenyl) pentaerythritol diphosphate | 154862-43-8 |
| TDP | Tridecylphosphite | 25448-25-3 |
| DPDP | Diphenyl monodecyl phosphite | 26544-23-0 |
| TPP | Triphenylphosphine | 603-35-0 |
| Irganox 1076 | Octadecyl3(3,5ditertbutyl4hydroxyphenyl)propionate | 2082-79-3 |
| PETS | Palmitic/Stearic Acid Ester of Dipenta/Pentaerythritol | 115-83-3 |

TABLE 1-continued

| Resins (Table 1A) | | |
|---|---|---|
| UV5411 | 2-(2'-Hydroxy-5'-t-octylphenyl) benzotriazole | 3147-75-9 |
| UVA 234 (Tinuvin ® 234) | 2-(2 hydroxy-3,5 dicumyl) benzotriazole | 70321-86-7 |
| LA31RG/T360 (Tinuvin ® 360) | Phenol, 2,2'-methylenebis(6-(2H-benzotriazol-2-yl)-4-(1,1,3,3-tetramethylbutyl)- | 103597-45-1 |
| T1577 (Tinuvin ® 1577) | Phenol, 2-(4,6-diphenyl-1,3,5-triazin-2-yl)-5-(hexyloxy)- | 147315-50-2 |
| UV3030 (Uvinul ® 3030) | 1,3-Bis((2-cyano-3,3-diphenylacryloyl)oxy)-2,2-bis(((2-cyano-3,3-diphenylacryloyl)oxy)methyl)propane | 178671-58-4 |
| BuTos | Butyl p-toluenesulfonate | 778-28-9 |
| $H_3PO_3$ | Phosphorous acid | 10294-56-1 |
| $H_3PO_4$ | Phosphoric acid | 7664-38-2 |

To determine the color stability upon processing, color plaques having a thickness of 2.5 millimeters (mm) were injection molded on a machine dedicated to transparent polycarbonate (Engel-75). Materials were dried at 120 degrees Celsius (° C.) for 2-3 hours (hrs) prior to injection molding. As a reference for standard molding conditions, the following temperature profile was used: Zone 1/Zone 2/Zone 3/Nozzle=280/290/300/295° C. The residence time of the material in the screw was controlled by the cooling time. These processing conditions are indicated herein as T(melt)/residence time (in minutes (')) (e.g., 300° C./6'). Similarly, abusive molding may be performed at higher temperatures (as discussed herein), but with the same temperature profile as for the reference condition.

Color values (L*, a*, b* and YI) were calculated from the absorption spectrum of a 2.5 mm thick color plaque (600 mm×600 mm) between 400 nanometers (nm) and 700 nm. The spectrum was measured on a Macbeth 7000A device in transmission mode and UV excluded. The YI (yellowness index) values provided herein have been calculated according to ASTM D1925 (1988) (Test Method for Yellowness Index of Plastics (Withdrawn 1995)). To simulate degradation of a PC part under the influence of outdoor conditions including UV light, accelerated weathering was performed according to ISO 11341:2004 (Determination of adhesion/cohesion properties of sealants after exposure to heat, water and artificial light through glass). This test is performed on 2.5 mm thick color plaques which are exposed in an ATLAS CI5000 weathering chamber that utilizes Xenon light (300-400 nm, 50 watts per square meter ($W/m^2$)). Black standard temperature is 65° C. Chamber temperature is 40° C. Relative humidity is 70%. Aging is done under constant light. Spraying occurs on a cycle of 18 minutes (min) on 102 min off and repeats every two hours. An inner quartz filter is used and the outer filter is a coated infrared absorbing ("CIRA") filter.

The level of bound (and free) UV absorbing component was measured by gas chromatography (GC). Molecular weight loss was determined by gel permeation chromatography (GPC).

Acid Stabilizer Components Combined with a Heat Stabilizer Component

IRG and TPP are both generally used heat stabilizer components that do not provide good protection against UV reaction with the polycarbonate chain. As shown in Tables 2A-2C, the addition of a small amount of an acid stabilizer component, including but not limited to phosphorous acid ($H_3PO_3$), phosphoric acid ($H_3PO_4$) or an alkyl tosylate (BuTos) in combination with these heat stabilizer components can yield a composition where the reaction of the UV absorbing component is minimized or prevented.

TABLE 2A (Effect of stabilizer - BuTos)

| | Unit | Ex1 | C1a | C1b | C1c | Ex2 | C2 | Ex3 | C3 |
|---|---|---|---|---|---|---|---|---|---|
| Component | | | | | | | | | |
| PC1 | wt % | 17.3 | 17.3 | 17.3 | 17.3 | 17.3 | 17.3 | 17.3 | 17.3 |
| PC2 | wt % | 82 | 82.08 | 82 | 82.08 | 82.32 | 82.32 | 82.175 | 82.175 |
| Irganox 1076 | wt % | 0.02 | 0.02 | 0.02 | 0.02 | — | — | — | — |
| PETS | wt % | 0.3 | 0.3 | 0.3 | 0.3 | — | — | 0.3 | 0.3 |
| Heat stabilizer component | type | IRG | — | IRG | — | IRG | IRG | TPP | TPP |
| | wt % | 0.08 | — | 0.08 | — | 0.08 | 0.08 | 0.025 | 0.025 |
| Acid stabilizer component | type | BuTos | — | — | BuTos | BuTos | — | BuTos | — |
| | ppm | 1 | — | — | 1 | 1 | 1 | 1 | — |
| UV absorbing component | type | UV5411 | UV5411 | UV5411 | UV5411 | UV5411 | UV5411 | UV5411 | UV5411 |
| | wt % | 0.3 | 0.3 | 0.3 | 0.3 | 0.3 | 0.3 | 0.2 | 0.2 |
| Property | | | | | | | | | |
| Initial YI molding (350° C./15') | D1925 | 1.83 | 2.55 | 1.73 | 1.77 | 1.69 | 1.92 | 1.7 | 2.54 |

TABLE 2A-continued (Effect of stabilizer - BuTos)

| | Unit | Ex1 | C1a | C1b | C1c | Ex2 | C2 | Ex3 | C3 |
|---|---|---|---|---|---|---|---|---|---|
| UV loss (350° C./15' vs pellets) | % | 23 | 70 | 82 | 84 | 4.6 | 85 | 34 | 83 |
| Mw loss (350° C./15' vs pellets) | % | 3.5 | 20 | 11 | 11 | 4.3 | 11 | 6.7 | 11 |
| Ratio of bound to free UV | | 0.30 | 2.4 | 4.5 | 5.4 | 0.05 | 5.7 | 0.52 | 5.0 |

TABLE 2B (Effect of stabilizer - $H_3PO_3$)

| | Unit | Ex4 | C4a | C4b | C4c | Ex5 | C5 | Ex6 | C6 |
|---|---|---|---|---|---|---|---|---|---|
| Component | | | | | | | | | |
| PC1 | wt % | 17.3 | 17.3 | 17.3 | 17.3 | 17.3 | 17.3 | 17.3 | 17.3 |
| PC2 | wt % | 82 | 82.08 | 82 | 82.08 | 82.32 | 82.32 | 82.175 | 82.175 |
| Irganox 1076 | wt % | 0.02 | 0.02 | 0.02 | 0.02 | — | — | — | — |
| PETS | wt % | 0.3 | 0.3 | 0.3 | 0.3 | — | — | 0.3 | 0.3 |
| Heat stabilizer component | type | IRG | — | IRG | — | IRG | IRG | TPP | TPP |
| | wt % | 0.08 | — | 0.08 | — | 0.08 | 0.08 | 0.025 | 0.025 |
| Acid stabilizer component | type | $H_3PO_3$ | — | — | $H_3PO_3$ | $H_3PO_3$ | — | $H_3PO_3$ | — |
| | ppm | 3 | — | — | 3 | 3 | — | 3 | — |
| UV absorbing component | type | UV5411 | UV5411 | UV5411 | UV5411 | UV5411 | UV5411 | UV5411 | UV5411 |
| | wt % | 0.3 | 0.3 | 0.3 | 0.3 | 0.3 | 0.3 | 0.2 | 0.2 |
| Property | | | | | | | | | |
| Initial YI molding (350° C./15') | D1925 | 1.77 | 2.55 | 1.73 | 2.21 | 1.7 | 1.92 | 1.65 | 2.54 |
| UV loss (350° C./15' vs pellets) | % | 2.8 | 70 | 82 | 80 | 1.8 | 85 | 76 | 83 |
| Mw loss (350° C./15' vs pellets) | % | 6.0 | 20 | 11 | 10 | 4.7 | 11 | 7.7 | 11 |
| Ratio of bound to free UV | | 0.03 | 2.4 | 4.5 | 4.0 | 0.02 | 5.7 | 3.1 | 5.0 |

TABLE 2C (Effect of stabilizer - $H_3PO_4$ and Citric Acid)

| | Unit | Ex7 | C7a | C7b | C7c |
|---|---|---|---|---|---|
| Component | | | | | |
| PC1 | wt % | 17.3 | 17.3 | 17.3 | 17.3 |
| PC2 | wt % | 82 | 82.08 | 82 | 82.08 |
| Irganox 1076 | wt % | 0.02 | 0.02 | 0.02 | 0.02 |
| PETS | wt % | 0.3 | 0.3 | 0.3 | 0.3 |
| Heat stabilizer component | type | IRG | — | IRG | IRG |
| | wt % | 0.08 | — | 0.08 | 0.08 |
| Acid stabilizer component | type | $H_3PO_4$ | $H_3PO_4$ | Citric acid | Citric acid/$H_2O$ |
| | ppm | 3 | 3 | 3 | 3 + 100 |
| UV absorbing component | type | UV5411 | UV5411 | UV5411 | UV5411 |
| | wt % | 0.3 | 0.3 | 0.3 | 0.3 |
| Property | | | | | |
| Initial YI molding (350° C./15') | D1925 | 1.96 | 2.2 | 2.59 | 2.64 |
| UV loss (350° C./15' vs pellets) | % | 11 | 89 | 88 | 88 |
| Mw loss (350° C./15' vs pellets) | % | 3.4 | 8.0 | 12 | 12 |
| Ratio of bound to free UV | | 0.13 | 8.3 | 7.0 | 7.0 |

Compare, Ex1 to Ex7, each of which include a heat stabilizer component and an acid stabilizer component according to embodiments of the present disclosure, to their associated comparative examples (C1a-c, C2 . . . C7a-c), which: lack an acid stabilizer component (C1a, C1b, C2, C3, C4a, C4b, C5 and C6), lack a heat stabilizer component (C1a, C1c, C4a, C4c and C7a) or include a different acid (citric acid, see C7b and C7c) that is not considered to be within the scope of aspects of the present disclosure. As can be seen from each of the examples for which data is available, for all examples including IRG or TPP as the heat stabilizer and that also include either BuTos, $H_3PO_3$, or $H_3PO_4$ as the acid stabilizer component, the ratio of bound to free UV absorbing component is lower, and in most cases substantially lower, than comparative examples which do not include one of these acid stabilizer components.

Effect of Acid Stabilizer Concentration

Tables 3A and 3B demonstrate the effect of acid stabilizer concentration on the UV loss/ratio of bound to free UV absorbing component for two acid stabilizer components, BuTos and $H_3PO_3$. For BuTos, the ratio of bound to free UV absorbing component decreases rapidly (from about 17 to less than 1) at a BuTos level between about 0.3 and 0.6 ppm, as shown in Table 3A. For $H_3PO_3$, the decrease in ratio of bound to free UV absorbing component is observed between about 2 and 4 ppm $H_3PO_3$ (the ratio decreases from about 17 to less than 1), as shown in Table 3B.

TABLE 3A (Effect of BuTos Concentration)

| | Unit | Ex8a | Ex8b | Ex8c | Ex8d | C8 |
|---|---|---|---|---|---|---|
| Component | | | | | | |
| PC1 | wt % | 17.3 | 17.3 | 17.3 | 17.3 | 17.3 |
| PC2 | wt % | 82.1 | 82.1 | 82.1 | 82.1 | 82.1 |
| Irganox 1076 | wt % | 0.02 | 0.02 | 0.02 | 0.02 | 0.02 |
| PETS | wt % | 0.3 | 0.3 | 0.3 | 0.3 | 0.3 |
| Heat stabilizer component | type | IRG | IRG | IRG | IRG | IRG |
| | wt % | 0.08 | 0.08 | 0.08 | 0.08 | 0.08 |
| Acid stabilizer component | type | BuTos | BuTos | BuTos | BuTos | — |
| | ppm | 0.3 | 0.6 | 1 | 2 | — |
| UV absorbing component | type | UV5411 | UV5411 | UV5411 | UV5411 | UV5411 |
| | wt % | 0.2 | 0.2 | 0.2 | 0.2 | 0.2 |
| Property | | | | | | |
| UV loss (350° C./15' vs pellets) | % | 95 | 49 | 42 | 15 | 94 |
| Ratio of bound to free UV | | 17 | 0.95 | 0.72 | 0.18 | 16 |
| ΔYI heat aging (120° C., 2000 hrs) after 300° C./6' molding | D1925 | 1.0 | 1.4 | 1.3 | 1.2 | 1.2 |
| ΔYI heat aging (120° C., 2000 hrs) after 350° C./15' molding | D1925 | 2.4 | 2.1 | 2.1 | 3.0 | 2.4 |

TABLE 3B (Effect of $H_3PO_3$ Concentration)

| | Unit | Ex9a | Ex9b | Ex9c | C9 |
|---|---|---|---|---|---|
| Component | | | | | |
| PC1 | wt % | 17.3 | 17.3 | 17.3 | 17.3 |
| PC2 | wt % | 82.1 | 82.1 | 82.1 | 82.1 |
| Irganox 1076 | wt % | 0.02 | 0.02 | 0.02 | 0.02 |
| PETS | wt % | 0.3 | 0.3 | 0.3 | 0.3 |
| Heat stabilizer component | type | IRG | IRG | IRG | IRG |
| | wt % | 0.08 | 0.08 | 0.08 | 0.08 |
| Acid stabilizer component | type | $H_3PO_3$ | $H_3PO_3$ | $H_3PO_3$ | — |
| | ppm | 2 | 4 | 6 | — |
| UV absorbing component | type | UV5411 | UV5411 | UV5411 | UV5411 |
| | wt % | 0.2 | 0.2 | 0.2 | 0.2 |
| Property | | | | | |
| UV loss (350° C./15' vs pellets) | % | 94 | 48 | 22 | 94 |
| Ratio of bound to free UV | | 17 | 0.92 | 0.28 | 17 |
| ΔYI heat aging (120° C., 2000 hrs) after 300° C./6' molding | D1925 | — | 2.3 | 2.7 | 1.2 |
| ΔYI heat aging (120° C., 2000 hrs) after 350° C./15' molding | D1925 | — | 3.1 | 4.2 | 2.4 |

Analysis of High Purity PC Resins

Ex10 and Ex11 (see Table 4) illustrate that aspects of the present disclosure can be applied to higher purity resins, such as those produced from high purity Bisphenol A polycarbonate. The compositions of Ex10 and Ex11, which include an acid stabilizer component (BuTos) show a ratio of bound to free UV absorbing component of 0.19 and 0.55, respectively, after abusive molding. In contrast, comparative examples C10 and C11, which do not include an acid stabilizer component, had a ratio of bound to free UV absorbing component of 8.3 and 6.3, respectively, after abusive molding.

TABLE 4

|  | Unit | Ex10 | C10 | Ex11 | C11 |
|---|---|---|---|---|---|
| Component |  |  |  |  |  |
| PC3 | wt % | 17.3 | 17.3 | 17.3 | 17.3 |
| PC4 | wt % | 82.1 | 82.1 | 82.165 | 82.165 |
| Irganox 1076 | wt % | 0.02 | 0.02 | 0.02 | 0.02 |
| PETS | wt % | 0.3 | 0.3 | 0.3 | 0.3 |
| Heat stabilizer component | type | IRG | IRG | TPP | TPP |
|  | wt % | 0.08 | 0.08 | 0.015 | 0.015 |
| Acid stabilizer component | type | BuTos | — | BuTos | — |
|  | ppm | 0.6 | — | 0.6 | — |
| UV absorbing component | type | UV5411 | UV5411 | UV5411 | UV5411 |
|  | wt % | 0.2 | 0.2 | 0.2 | 0.2 |
| Property |  |  |  |  |  |
| Initial YI (molding 350° C./15') | D1925 | 1.64 | 1.64 | 1.65 | 2.4 |
| UV loss (350° C./15' vs pellets) | % | 16 | 89 | 35 | 86 |
| Mw loss (350° C./15' vs pellets) | % | 4.3 | 9.4 | 9.5 | 12 |
| Ratio of bound to free UV |  | 0.19 | 8.3 | 0.55 | 6.3 |

Binding of Reactive UV Absorbing Components to the Polycarbonate Chain

The following examples (Ex12, Ex13 and Ex14) in Table 5 demonstrate how different types of UV absorbing components with reactive groups can bind to the polycarbonate backbone. UV5411 and LA31RG (Ex12 and Ex13, respectively) are benzotriazole UV absorbing components, which contain a phenolic hydroxyl group that can react with the carbonate group in polycarbonate. T1577 (Ex14) is a triazine, also containing an active hydroxyl group. Ex12 includes a formulation that corresponds to a current standard material used in automotive headlamps ("COMP"), but which includes an acid stabilizer component (BuTos). The improvement in ratio of bound to free UV absorbing component with the addition of an acid stabilizer component is readily apparent. Compare Ex12 (0.30) to COMP (4.52), Ex13 (0.25) to C13 (2.70) and Ex14 (~0) to C14 (∞).

TABLE 5

|  | Unit | COMP | Ex12 | Ex13 | C13 | Ex14 | C14 |
|---|---|---|---|---|---|---|---|
| Component |  |  |  |  |  |  |  |
| PC1 | wt % | 17.3 | 17.3 | 17.3 | 17.3 | 17.3 | 17.3 |
| PC2 | wt % | 82 | 82 | 82.15 | 82.15 | 82 | 82 |
| Irganox 1076 | wt % | 0.02 | 0.02 | 0.02 | 0.02 | 0.02 | 0.02 |
| PETS | wt % | 0.3 | 0.3 | 0.3 | 0.3 | 0.3 | 0.3 |
| Heat stabilizer component | type | IRG | IRG | IRG | IRG | IRG | IRG |
|  | wt % | 0.06 | 0.08 | 0.08 | 0.08 | 0.08 | 0.08 |
| Acid stabilizer component | type | — | BuTos | BuTos | — | BuTos | — |
|  | wt % | — | 1 | 1 | — | 1 | — |
| UV absorbing component | type | UV5411 | UV5411 | LA31RG | LA31RG | T1577 | T1577 |
|  | wt % | 0.27 | 0.3 | 0.15 | 0.15 | 0.3 | 0.3 |
| Property |  |  |  |  |  |  |  |
| Initial YI (molding 350° C./15') | D1925 | 1.75 | 1.83 | 2.2 | 2.54 | 2.4 | 2.89 |
| UV loss (350° C./15' vs pellets) | % | 82 | 23 | 20 | 73 | <20* | >50* |
| Mw loss (350° C./15' vs pellets) | % | 11 | 3.5 | 3.1 | 9.0 | 14 | 8.3 |
| Ratio of bound to free UV |  | 4.5 | 0.30 | 0.25 | 2.7 | ~0* | ∞* |

*Analysis performed qualitatively by GPC detection of bound UV

Phosphorous Acid Esters and Phosphites as Heat Stabilizer Components

In the presence of phosphorous acid esters or phosphite heat stabilizer components, the reactivity of the UV absorbing components can be decreased even without the inclusion of an acid stabilizer component. See Tables 6A and 6B. As was shown for Ex15a-c (Table 6A), the inclusion of PEPQ, TDP and DPDP resulted in a very low UV absorbing component (UV5411) and ratio of bound to free UV absorbing component of 0.08, 0.07 and 0.06, respectively. As shown in Table 6B, the inclusion of PEPQ and DP in compositions including LA31RG as a UV absorbing component also results in lower levels of bound UV. In contrast, the comparative examples including no heat stabilizer component (C15a) or a heat stabilizer component including IRG (C15b and C16) or TPP (C15c and C5d) exhibited a high UV loss and a ratio of bound to free UV absorbing component of at least 2.4 (example C15a). The different phosphites are esters of phosphorous acids or phosphor containing acids, and have different stability with respect to hydrolysis. For example, PEPQ is known as a more acidic stabilizer than IRG, and has poor hydrolytic stability, which yields acidic hydrolysis products. It is thought that this may be one of the reasons for its beneficial effect on preventing UV absorbing component reactivity with polycarbonate. A phosphite that generates acidic groups by hydrolysis of at least one of its ester groups can prevent reactivity of UV absorbing components with the polycarbonate. One drawback, however, is that some phosphorous acids that prevent UV absorbing component reactivity also exhibit a larger molecular weight loss and poor heat aging performance.

TABLE 6B (No Acid Stabilizer Component; LA31RG as UV absorbing component)

| | Unit | Ex16a | Ex16b | C16 |
|---|---|---|---|---|
| Component | | | | |
| PC1 | wt % | 17.3 | 17.3 | 17.3 |
| PC2 | wt % | 82.17 | 82.18 | 82.15 |
| Irganox 1076 | wt % | 0.02 | 0.02 | 0.02 |
| PETS | wt % | 0.3 | 0.3 | 0.3 |
| Heat stabilizer component | type | PEPQ | DP* | IRG |
| | wt % | 0.06 | 0.05 | 0.04 |
| UV absorbing component | type | LA31RG | LA31RG | LA31RG |
| | wt % | 0.15 | 0.15 | 0.15 |
| Property | | | | |
| Initial YI molding (350° C./15') | D1925 | 2.24 | 2.41 | 2.77 |
| UV loss (350° C./15' vs pellets) | % | 15 | 7.6 | 73 |
| Mw loss (350° C./15' vs pellets) | % | 3.2 | 3.2 | 9 |
| Ratio of bound to free UV | | 0.18 | 0.08 | 2.7 |

*contains epoxy

TABLE 6A (No Acid Stabilizer Component; UV5411 as UV absorbing component)

| | Unit | Ex15a | Ex15b | Ex15c | C15a | C15b | C15c | C15d |
|---|---|---|---|---|---|---|---|---|
| Component | | | | | | | | |
| PC1 | wt % | 17.3 | 17.3 | 17.3 | 17.3 | 17.3 | 17.3 | 17.3 |
| PC2 | wt % | 82.12 | 82 | 82 | 82.08 | 82 | 82.17 | 82.17 |
| Irganox 1076 | wt % | 0.02 | 0.02 | 0.02 | 0.02 | 0.02 | — | — |
| PETS | wt % | 0.3 | 0.3 | 0.3 | 0.3 | 0.3 | 0.3 | 0.3 |
| Heat stabilizer component | type | PEPQ | TDP | DPDP | — | IRG | TPP | TPP |
| | wt % | 0.06 | 0.08 | 0.08 | — | 0.08 | 0.025 | 0.08 |
| UV absorbing component | type | UV5411 | UV5411 | UV5411 | UV5411 | UV5411 | UV5411 | UV5411 |
| | wt % | 0.2 | 0.3 | 0.3 | 0.3 | 0.2 | 0.2 | 0.2 |
| Property | | | | | | | | |
| Initial YI molding (350° C./15') | D1925 | 1.66 | 2.2 | 2.37 | 2.55 | 2.02 | 2.54 | 4.28 |
| UV loss (350° C./15' vs pellets) | % | 7.6 | 6.2 | 5.9 | 70 | 94 | 83 | 82 |
| Mw loss (350° C./15' vs pellets) | % | 23 | 12 | 11 | 20 | 9.1 | 11 | 11 |
| Ratio of bound to free UV | | 0.08 | 0.07 | 0.06 | 2.4 | 16 | 5.0 | 4.6 |

Effect of Processing Temperature and Residence Time

It is evident that both the processing temperature and residence time affect the amount of UV that react with the polycarbonate resin. While 280-290° C. may be considered a standard processing temperature, as discussed herein, higher temperatures can be considered abusive for polycarbonate resin. Further, while residence times of up to 6 minutes have been used, longer residence times (such as those used in 2-component (2K) molding applications), may also be abusive as discussed herein.

As is shown in FIG. 1, which includes processing data for COMP (C17 in Table 7), at 300° C., virtually no bound UV is observed for residence times up to 18 min. However, at 330° C., the level of bound UV in COMP increases from 20% to about 70% when the residence time increases from 6 to 18 min. At 350° C. COMP shows about 60% bound UV within a residence time of only 6 min and over 70% bound UV within a residence time of 9 min. It should be noted that the 70% level of bound UV results from the detection of a very low amount of free UV absorbing component, close to the detection limit of the equipment used in the analysis method; it may be interpreted from this that virtually no free, active UV absorbing component remains. In contrast, as shown throughout the examples presented herein, inclusion of an acid stabilizer component such as BuTos, $H_3PO_3$ or $H_3PO_4$ with a heat stabilizer component, or inclusion of particular heat stabilizer components without the inclusion of an acid stabilizer component, can result in molded articles having very low ratios (<1) of bound to free UV absorbing component even after abusive molding at a temperature of 350° C. and for a residence time of 15 min.

TABLE 7

(Effect of Processing Temperatures and Times)

| | Unit | Ex17a | Ex17b | C17 (COMP) |
|---|---|---|---|---|
| Component | | | | |
| PC1 | wt % | 17.3 | 17.3 | 17.3 |
| PC2 | wt % | 82 | 82 | 82 |
| Irganox 1076 | wt % | 0.02 | 0.02 | 0.02 |
| PETS | wt % | 0.3 | 0.3 | 0.3 |
| Heat stabilizer component | type | IRG | IRG | IRG |
| | wt % | 0.06 | 0.06 | 0.06 |
| Acid stabilizer component | type | BuTos | BuTos | — |
| | ppm | 1 | 2 | — |
| UV absorbing component | type | UV5411 | UV5411 | UV5411 |
| | wt % | 0.20 | 0.27 | 0.27 |
| Property | | | | |
| Initial YI molding (330° C./12') | D1925 | 1.52 | 1.61 | 0.45* |
| Ratio of bound to free UV | | 0.11 | 0.19 | 3.4 |
| Initial YI molding (340° C./10') | D1925 | 1.65 | 1.65 | 0.88* |
| Ratio of bound to free UV | | 0.31 | 0.22 | 2.9 |
| Initial YI molding (350° C./6') | D1925 | 1.68 | 1.77 | 0.97* |
| Ratio of bound to free UV | | 0.30 | 0.27 | 2.6 |
| Initial YI molding (360° C./3') | D1925 | 1.67 | 1.74 | 0.91 |
| Ratio of bound to free UV | | 0.10 | 0.16 | 0.82 |

*contained colorants

Weathering Performance

The following examples demonstrate how upon high heat processing a large percentage of the UV absorbing component becomes bound to the polycarbonate chain, and how this affects color stability in accelerated weathering. This is shown for a current standard material used in automotive headlamps ("COMP"). C18 and C19, which correspond to Ex18 and Ex19 but which do not include an acid stabilizer component, are provided for comparison. Ex20 and Ex21, which include compositions in accordance with the present disclosure, demonstrate that by adding alternative phosphorous acid esters as heat stabilizer components, bonding of UV absorbing component to the chain is prevented or minimized. This provides better weathering performance and lower loss of molecular weight (Mw) after high heat processing.

These examples further illustrate that a good color stability property does not necessarily relate to good UV retention properties. For example, COMP and C19 show a relatively low change in YI upon processing (Initial YI molding of 1.17 and 2.54, respectively), but a high ratio of bound to free UV absorbing component (3.78 and 2.7, respectively). Accordingly, color stability and initial color are not good indicators for the retention of the UV performance and molecular weight. Rather, the loss of UV absorbing component is related to a loss in molecular weight: the examples with high levels of bound UV (COMP, C18 and C19) also demonstrated a higher loss of molecular weight (>6%). In contrast, the examples according to aspects of the disclosure—Ex18, Ex19, Ex20 and Ex21—each of which had low levels of bound UV (ratio of bound to free UV absorbing component less than 1.0) exhibited a molecular weight loss of 3.2% or less. This included Ex20 and Ex21, which include PEPQ or DP (two phosphorous acid esters with lower hydrolytic stability than IRG) as the heat stabilizer component and which did not include a separate acid stabilizer component.

TABLE 8

| | Unit | COMP | Ex18 | C18 | Ex19 | C19 | Ex20 | Ex21 |
|---|---|---|---|---|---|---|---|---|
| Component | | | | | | | | |
| PC1 | wt % | 17.3 | 17.3 | 17.3 | 17.3 | 17.3 | 17.3 | 17.3 |
| PC2 | wt % | 82.04 | 82.1 | 82.1 | 82.15 | 82.15 | 82.17 | 82.18 |
| Irganox 1076 | wt % | 0.02 | 0.02 | 0.02 | 0.02 | 0.02 | 0.02 | 0.02 |
| PETS | wt % | 0.3 | 0.3 | 0.3 | 0.3 | 0.3 | 0.3 | 0.3 |
| Heat stabilizer component | type | IRG | IRG | IRG | IRG | IRG | PEPQ | DP* |
| | wt % | 0.06 | 0.08 | 0.08 | 0.08 | 0.08 | 0.06 | 0.05 |
| UV absorbing component | type | UV5411 | UV5411 | UV5411 | LA31RG | LA31RG | LA31RG | LA31RG |
| | wt % | 0.27 | 0.2 | 0.2 | 0.15 | 0.15 | 0.15 | 0.15 |
| Acid stabilizer component | type | | $H_3PO_3$ | — | $H_3PO_3$ | — | — | — |
| | ppm | | 4 | | 4 | | | |
| Property | | | | | | | | |
| UV loss (350° C./15' vs pellets) | % | 79 | 48 | 94 | 14 | 73 | 15 | 7.6 |
| Ratio of bound to free UV | | 3.8 | 0.92 | 16.5 | 0.16 | 2.7 | 0.18 | 0.08 |
| ΔYI weathering ISO 11341 (2250 hrs) after 300° C./6' molding | D1925 | 5.7 | 6.4 | 6.7 | 7.5 | 7.6 | 7.1 | 6.8 |
| ΔYI weathering ISO 11341 (2250 hrs) after 350 C./15' molding | D1925 | 8.7 | 7.6 | 8.9 | 7.7 | 9.8 | 7.1 | 6.6 |

*contained tints

Combinations of Heat Stabilizer Components

Although not demonstrated in the present disclosure, the combination of a low amount of a phosphite heat stabilizer component with another heat stabilizer component (such as but not limited to IRG) may have a similar beneficial effect. Such combinations may limit the negative effect on molecular weight loss.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

That which is claimed is:

1. A method for forming a molded article comprising: combining a polycarbonate resin produced by an interfacial polymerization process and having an endcap level of at least about 98%; an ultraviolet (UV) absorbing component; a heat stabilizer component; and an acid stabilizer component comprising butyl p-toluenesulfonate to form a mixture, wherein the acid stabilizer is present in the composition in an amount of about 0.6 to about 2 ppm; and
forming the molded article from the mixture by molding the mixture under abusive molding conditions;
wherein the molded article comprises a ratio of bound UV absorbing component to free UV absorbing component of less than about 1.0;
wherein the abusive molding conditions comprise molding at a maximum molding temperature of 330 to less than 340° C. at a residence time of at least 10 minutes, or a maximum molding temperature of 340 to less than 360° C. at a residence time of at least 6 minutes, or a maximum molding temperature of at least 360° C. at a residence time of at least 3 minutes.

2. The method for forming the molded article according to claim 1, wherein the acid stabilizer component further comprises phosphorous acid, phosphoric acid, or a combination thereof.

3. The method for forming the molded article according to claim 1, wherein the article comprises an automotive lighting lens.

4. The method for forming the molded article according to claim 1, wherein the article comprises a head lamp cover, a head lamp lens, an inner lens, a fog lamp lens, a rear lamp lens, a rear lamp inner lens, an interior lamp lens, or is suitable for use in light guide, automotive glazing or window applications.

5. The method for forming the molded article according to claim 1, wherein the UV absorbing component comprises a benzotriazole compound, a triazine compound, or a combination thereof.

6. The method for forming the molded article according to claim 1, wherein the UV absorbing component comprises 2-(2'-hydroxy-5'-tert-octylphenyl)benzotriazole, 2-(2-hydroxy-3,5-dicumyl)benzotriazole, 2,2'-methylenebis[6-(2H-benzotriazol-2-yl)-4-(1,1,3,3-tetramethylbutyl)phenol], or a combination thereof.

7. The method for forming the molded article according to claim 1, wherein the heat stabilizer component comprises tris-(2,4-di-tert-butyl phenyl)phosphite, triphenylphosphine, or a combination thereof.

8. The method for forming the molded article according to claim 1, wherein the polycarbonate resin is produced from a bisphenol A polymer having a purity of at least about 99.70%, a hydroxyl content less than 100 ppm by weight, and which contains less than 2 ppm sulfur.

9. The method for forming the molded article according to claim 1, wherein the polycarbonate resin exhibits a molecular weight loss of less than about 10% as compared to the molecular weight of the polycarbonate resin prior to the abusive molding.

10. The method for forming the molded article according to claim 1, wherein the ratio of bound UV absorbing component to free UV absorbing component is less than about 0.66 when molded under abusive molding conditions.

11. The method for forming the molded article according to claim 1, wherein the ratio of bound UV absorbing component to free UV absorbing component is less than about 0.33 when molded under abusive molding conditions.

12. The method for forming the molded article according to claim 1, wherein the ratio of bound UV absorbing component to free UV absorbing component is less than about 0.17 when molded under abusive molding conditions.

13. The method for forming the molded article according to claim 1, wherein the molded article, when tested in accordance with ASTM D1925 (1988) using a 2.5 mm thick plaque, has a yellowing index (YI) less than about 4.0, or a YI of less than about 3.5, or a YI of less than about 3.0, or a YI of less than about 2.5, or a YI of less than about 2.0, or a YI of from about 1.0 to about 2.5.

14. The method for forming the molded article according to claim 1, wherein the molded article, when tested in accordance with ASTM D1925 (1988) using a 2 mm thick plaque, exhibits an increase in YI of less than about 4.0 after 2000 hours of heat aging at 120° C., or an increase in YI of less than about 3.5 after 2000 hours of heat aging at 120° C., or an increase in YI of less than about 3.0 after 2000 hours of heat aging at 120° C., or an increase in YI of less than about 2.5 after 2000 hours of heat aging at 120° C., or an increase in YI of less than about 2.0 after 2000 hours of heat aging at 120° C., or an increase in YI of from about 1.0 to about 4.0 after 2000 hours of heat aging at 120° C.

15. The method for forming the molded article of claim 1, wherein the UV absorbing component comprises a benzotriazole compound, a triazine compound, or a combination thereof; and
wherein the heat stabilizer component comprises tris-(2,4-di-tert-butyl phenyl)phosphite, triphenylphosphine, or a combination thereof.

16. A method for forming a molded article comprising:
combining a polycarbonate resin produced by an interfacial polymerization process and having an endcap level of at least about 98%; an ultraviolet (UV) absorbing component; a heat stabilizer component comprising tetrakis(2,4-di-tert-butylphenyl)-4,4-biphenyldiphosphonite), bis(2,4-dicumyl phenyl) pentaerythritol diphosphite, tridecylphosphite, diphenyl monodecyl phosphite, or combinations thereof, and an acid stabilizer component to form a mixture, wherein the acid stabilizer component comprises butyl p-toluene, sulfonate, wherein the acid stabilizer is present in the composition in an amount of about 0.6 to about 2 ppm and
forming the molded article from the mixture by molding the mixture under abusive molding conditions;
wherein the molded article molded under abusive molding conditions and comprises a ratio of bound UV absorbing component to free UV absorbing component of less than about 1.0;
wherein the abusive molding conditions comprise a maximum molding temperature of 330 to less than 340° C. at a residence time of at least 10 minutes, or a maximum molding temperature of 340 to less than 360° C. at a residence time of at least 6 minutes, or a maximum molding temperature of at least 360° C. at a residence time of at least 3 minutes.

17. A method for forming a molded article comprising:
combining a polycarbonate resin produced by an interfacial polymerization process and having an endcap level of at least about 98%; an ultraviolet (UV) absorbing component; a heat stabilizer component; and an acid stabilizer component comprising butyl p-tolenesulfonate to form a mixture; wherein the acid stabilizer is present in the composition in an amount of about 0.6 to about 2 ppm; and
forming the molded article from the mixture by molding the mixture under abusive molding conditions;
wherein the molded article was formed by abusive molding and the polycarbonate resin exhibits a molecular weight loss of less than about 10% as compared to the molecular weight of the polycarbonate resin prior to the abusive molding;
wherein the abusive molding comprised a maximum molding temperature of 330 to less than 340° C. at a residence time of at least 10 minutes, or a maximum molding temperature of 340 to less than 360° C. at a residence time of at least 6 minutes, or a maximum molding temperature of at least 360° C. at a residence time of at least 3 minutes.

* * * * *